United States Patent

Ammerman

[15] 3,706,333
[45] Dec. 19, 1972

[54] FISH SKINNING PROCESS

[72] Inventor: Gale R. Ammerman, Starkville, Miss.

[73] Assignee: Mississippi State University Development Foundation, Inc., State College, Miss.

[22] Filed: May 11, 1971

[21] Appl. No.: 142,239

[52] U.S. Cl. .................. 146/228, 146/235, 146/241, 17/62
[51] Int. Cl. ............................................. A22c 25/17
[58] Field of Search ...... 146/228, 232, 233, 235, 241; 17/62

[56] References Cited

UNITED STATES PATENTS

| 1,921,055 | 8/1933 | Vucassovich .................. 146/228 X |
| 1,921,440 | 8/1933 | Taylor .............................. 146/228 X |

*Primary Examiner*—Willie G. Abercrombie
*Attorney*—Millen, Raptes & White

[57] ABSTRACT

Catfish are skinned by immersing in a hot caustic bath for 1–3 minutes, rinsing, neutralizing in an acid bath, e.g., acetic or citric acid, and rinsing. The fish are preferably first deheaded, eviscerated and frozen and then refrozen after deskinning.

10 Claims, 2 Drawing Figures

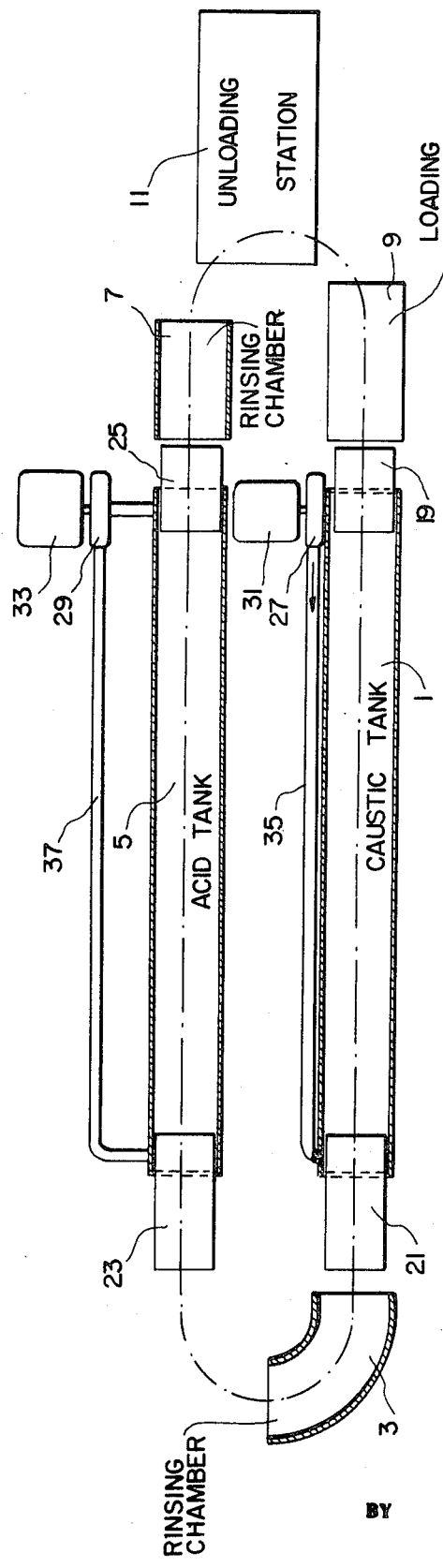
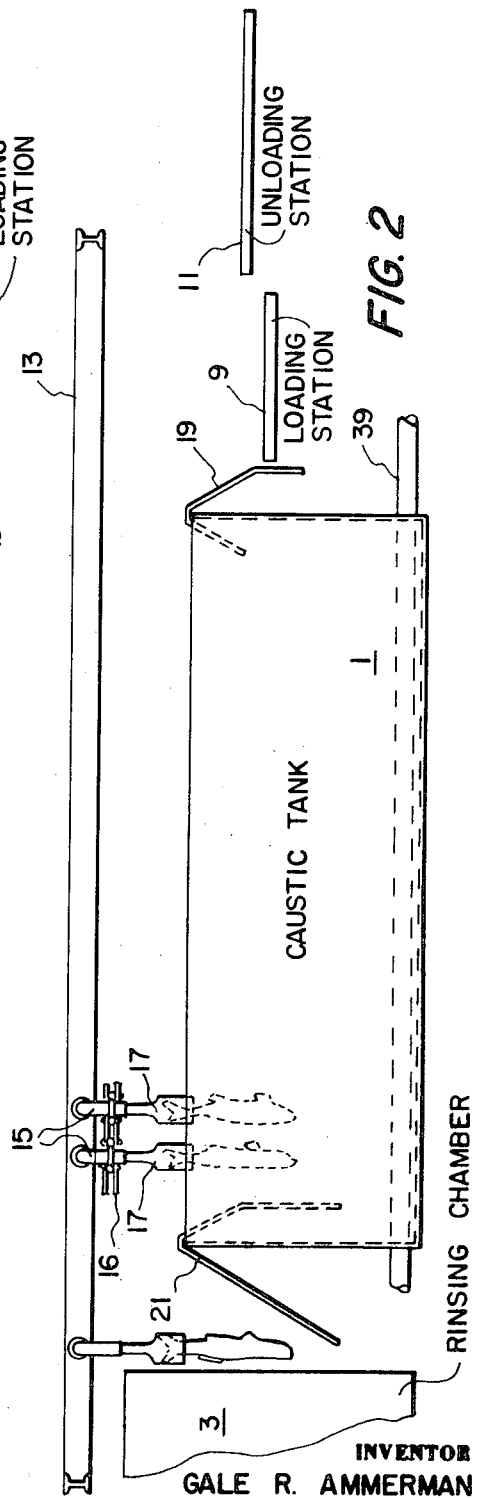

FISH SKINNING PROCESS

BACKGROUND OF THE INVENTION

Skinning catfish is a laborious and time-consuming task which presently is done partially mechanically, followed by clean-up by hand. Usually five or six women are needed to complete the skinning of the fish which are fed to a Townsend skinning machine by another person. This labor cost contributes significantly to the cost of the finished product. Moreover, the appearance of the cleaned fish is not always ideal.

Accordingly, it was desired to develop a process whereby catfish are cleaned in an attractive manner which does not require hand labor to complete the cleaning operation.

The process of U.S. Pat. No. 1,921,055 removes the frozen skin from fish by the application of heat. U.S. Pats. Nos. 1,921,440 and 2,380,755 disclose processes whereby the skin is caused to adhere to a cold surface and then removed from the fish mechanically. The process of U.S. Pat. No. 3,034,906 freezes squid and then surface tempers the skin to reduce the adherence to the flesh prior to skinning. U.S. Pats. Nos. 3,115,175 and 843,311 disclose processes for deskinning fruit with alkali followed by a rinse with an edible acid.

SUMMARY OF THE INVENTION

According to this invention, catfish and like skin-bearing fish are deskinned by the successive steps of immersing in hot caustic for a period of time sufficient to solubilize the skin but insufficient to cook the flesh beneath the skin; rinsing the caustic and solubilized skin from the fish; immersing the deskinned fish in an aqueous solution of a non-toxic acid; and washing the fish with water to approximate neutrality.

Surprisingly, the hot caustic does not adversely affect the texture or flavor of the flesh beneath the skin. The skin is completely removed leaving the surface of the flesh clean and smooth.

DETAILED DISCUSSION

The starting fish are catfish or other skin-bearing, i.e., scaleless fish. The fish can be whole cleaned. The head can be removed after skinning if desired, to avoid contacting exposed flesh to the caustic. However, this is not necessary and ordinarily not preferred. There is no apparent advantage to eviscerating the fish after skinning and the starting fish is preferably deheaded, definned and eviscerated. The tail is ordinarily retained.

The fish can be at room temperature, chilled or frozen. Because the hot caustic can more readily adversely affect the texture of fresh fish, i.e., the time of immersion must be more carefully regulated, the starting fish is preferably frozen, e.g., at a temperature of about 0° to −20° F. The most preferred starting fish are deheaded, definned and eviscerated frozen catfish with tail.

The initial step of this process is the solubilization of the skin of the fish with hot caustic. Although NaOH is preferred, it will be obvious other non-toxic strongly alkaline baths of comparable alkalinity, e.g., KOH, can be employed. The temperature of caustic is maintained at at least 150° F., preferably about 170°–212° F. The concentration of the caustic bath is about 5–15 percent, preferably about 5–11 percent, e.g., 9–11 percent for fresh fish and about 5–11 percent for frozen fish.

The time required to solubilize the skin varies inversely with the concentration of the caustic and the temperature thereof. At concentrations of about 5–7 percent at 212° F., about 1.5–2.5 minutes are usually required. At concentrations of 7–11 percent at 212° F., about one-half to 2 minutes are required. At lower temperatures, somewhat longer times are required, e.g., about 2.5–3 minutes with 5 percent caustic at 170° F.

It will be apparent that deskinning must be accomplished without cooking the flesh of the fish or otherwise adversely affecting the texture or taste of the surface thereof below the skin. Therefore, as soon as all of the skin is solubilized, the fish is removed from the caustic and immediately thereafter the caustic adhering to the exposed surfaces of the fish is removed by an aqueous rinse. Simultaneously, the solubilized skin of the fish is removed by rinsing. Although this can be accomplished by immersing the fish in an aqueous acid bath, for obvious economic reasons the fish is first rinsed in water to reduce acid consumption rate. A spray rinse is preferred to immersing in a water bath because of its greater efficiency and rate of removal.

When the starting fish is frozen, it ordinarily is maintained frozen throughout the deskinning operation. Therefore, the minimum possible volume of rinsing water is preferred. Pressure and/or spray nozzles can be employed to increase efficiency.

It will be apparent that acid consumption rate in the neutralizing step will be inversely proportional to the efficiency of this initial rinsing step. The economies in acid consumption realized by highly efficient rinsing of the caustic from the fish must, however, be balanced against the optimum production rate, thawing rate in the case of frozen fish, and water consumption.

In the next step of the process of this invention, the caustic remaining on the deskinned fish after the initial water rinse is removed by immersing the rinsed fish in an aqueous bath of a non-toxic acid, e.g., hydrochloric or phosphoric acid, preferably an edible acid, e.g., citric or acetic acid. Since the sole purpose of the acid bath is to remove any residual caustic adhering to the exposed surfaces of the deskinned fish, the concentration, temperature of the bath and time of exposure thereto is not particularly critical. A weakly acid solution, e.g., 1–5 percent, preferably about 2–4 percent, acetic or citric acid solution is preferred. Exposure times will vary with the efficiency of the initial rinsing step. About 1–3 minutes, e.g., about 2 minutes, generally suffices to neutralize all residual caustic.

The acid bath is usually maintained at about room temperature, although it can be chilled or slightly above room temperature, e.g., 32°–90° F. When the fish being deskinned is frozen, it is desired to maintain the fish as cold as possible. Therefore, shorter exposure times and/or a cool acid bath is preferred.

In the next step in the process of this invention, the fish is removed from the acid bath and rinsed with water to about neutrality, e.g., pH about 6.3 to 7.5, preferably about 6.5 to 6.8. To reduce acid consumption rate, this final rinse water can be reused as part or all of the rinse water in the initial rinse step and/or the acid can be recovered therefrom, e.g., when citric acid is used, with lime precipitation followed by treatment with sulfuric acid, employing conventional procedures.

Although the process has been described in a preferred embodiment in which the fish is deskinned in a bath of hot caustic and acidified in a bath of aqueous acid, the process can also be conducted by spraying or otherwise flushing the surface of the fish with a stream of hot caustic and a stream of aqueous acid, respectively. Such streams can be recirculated. The concentration and volume of the hot caustic and aqueous acid can be maintained by the addition thereto of solutions thereof of like or higher concentration.

The rinsed fish are then drained and packaged, e.g., in polyethylene pouches, and then frozen, or rechilled if already frozen, to 0° F. or colder. If the fish are to be immediately shipped to the consumer, they can be packed unfrozen in ice.

The skinned fish have a very attractive appearance and are substantially free of particles of skin and abraded flesh. Their appearance is superior to most conventionally skinned fish. The texture and taste of the flesh is unaffected by the skinning process.

Another advantage of the skinning process of this invention is the substantial reduction or elimination of naturally occuring bacteria on the exposed surfaces of the fish as a result of the exposure to the caustic and acid. If the rinsed fish are handled and packaged under conditions whereby they are not exposed to high bacteria levels, the unfrozen fish and the frozen fish after thawing have significantly longer holding times before spoilage, which is an added advantage to the purchaser.

The invention will be described with reference to the drawings wherein

FIG. 1 is a schematic top view; and

FIG. 2 a schematic plan view of equipment for the conductance of the process of this invention.

The equipment shown in the drawings consists of a caustic bath tank 1, an initial rinsing chamber 3, an acid bath tank 5, a final washing chamber 7, a loading station 9, an unloading station 11, a trolley track 13, a plurality of fish conveying trolleys 15 mounted on a driven link chain 16, a plurality of fish holding clamps 17 mounted on the fish conveying trolleys, a plurality 19, 21, 23 and 25 of guide trays, a pair 27, 29 of circulating pumps driven by motors 31 and 33, respectively, recirculating pipes 35 and 37 for circulating the liquid in tanks 1 and 5, respectively, and a steam pipe 39 for heating the caustic in tank 1.

Tank 1 is filled to level with caustic and tank 5 is filled with acid. Motors 31 and 33 are started to circulate the contents of the tanks via recirculating pipes 35 and 37, respectively, by pumps 27 and 29, respectively. Steam is passed through pipe 39 until the caustic reaches the desired temperature. The temperature is maintained by a thermostatically controlled shut-off valve (not shown) in the steam line. Water is turned on in spray chambers 3 and 5 and variable speed motor (not shown) driving link chain 16 is started at a speed which will immerse the fish in caustic tank 1 for the desired period of time. This speed also determines the time the fish are maintained in acid tank 5 and rinsing chambers 3 and 7.

Deheaded, defined and eviscerated catfish are loaded on loading station 9. The fish are attached by their tails to trolleys 15 by clamps 17. The fish are transported over guide tray 19 into caustic tank 1. The level of the caustic therein is maintained so that all except the tails of the fish are immersed therein. The fish emerge from tank 1 and are guided by guide tray 21 over the end of the tank and then transported into rinsing chamber 3, where substantially all of the caustic adhering to the fish is rinsed off. The rinsed fish are transported to acid tank 5 and guided by guide tray 23 into the tank. They are guided over the end of acid tank 5 by guide tray 25 and into final rinsing station 7, where the acid is washed from the fish. The rinsed fish are then transported by trolley 16 to unloading station 11, where the clamps are automatically opened, by means not shown, thus dropping the fish onto the unloading station where they are packaged.

Tables 1 and 2 below show the results of skinning catfish by the above procedure, using sodium hydroxide (170° F.) and citric acid (ambient temperature) at various concentrations. Acid rinse time was 2 minutes. The pH values given in Table 1 are those of the surface of the deskinned fish after final rinsing. Table 2 gives the carry-over sodium hydroxide values. It is apparent from these data that there is no measurable carry-over of caustic sodium or acid.

Good results are obtained with fresh fish using NaOH of 5, 7, 9, and 11 percent concentrations, respectively, at 212° F. with immersing times of 1.5–2 minutes. Excellent results are obtained with 7 percent NaOH with a 2-minute immersion time and with 9 and 11 percent concentrations, with a 1.5 to 2-minute immersion time. With frozen fish, excellent results were obtained with 5 percent NaOH at 170° F. with a 3-minute immersion time and 10 percent NaOH at 212° F. with a 40-second immersion time. A 2-minute immersion time in citric acid of 2 or 4 percent concentration was used throughout. Acetic acid gives the same results.

TABLE 1

| Concentration of citric acid (%) | Concentration of sodium hydroxide (%) | Time in sodium hydroxide solution (min) | pH Replication 1 | 2 | 3 | 4 | average pH |
|---|---|---|---|---|---|---|---|
| 2 | 5 | 1.5 | 6.4 | 6.5 | 6.4 | 6.6 | 6.5 |
| 2 | 5 | 2.0 | 6.6 | 6.4 | 6.4 | 6.5 | 6.5 |
| 2 | 5 | 2.5 | 6.6 | 6.9 | 6.5 | 6.9 | 6.7 |
| 2 | 8 | 1.5 | 6.6 | 6.6 | 6.6 | 6.5 | 6.6 |
| 2 | 8 | 2.0 | 6.7 | 6.8 | 6.6 | 6.8 | 6.7 |
| 2 | 8 | 2.5 | 6.8 | 6.6 | 6.5 | 6.7 | 6.7 |
| 2 | 11 | 1.5 | 6.6 | 6.7 | 6.7 | 6.9 | 6.7 |
| 2 | 11 | 2.0 | 6.8 | 6.7 | 6.7 | 6.5 | 6.7 |
| 2 | 11 | 2.5 | 6.6 | 6.8 | 6.5 | 6.7 | 6.7 |
| 4 | 5 | 1.5 | 6.6 | 6.4 | 6.5 | 6.5 | 6.5 |
| 4 | 5 | 2.0 | 6.6 | 6.6 | 6.5 | 6.5 | 6.6 |
| 4 | 5 | 2.5 | 6.7 | 6.7 | 6.5 | 6.5 | 6.6 |
| 4 | 8 | 1.5 | 6.5 | 6.5 | 6.6 | 6.6 | 6.6 |
| 4 | 8 | 2.0 | 6.5 | 6.8 | 6.4 | 6.6 | 6.6 |
| 4 | 8 | 2.5 | 6.8 | 6.7 | 6.5 | 6.5 | 6.6 |
| 4 | 11 | 1.5 | 6.5 | 6.5 | 6.8 | 6.4 | 6.6 |
| 4 | 11 | 2.0 | 6.5 | 6.6 | 6.5 | 6.6 | 6.6 |
| 4 | 11 | 2.5 | 6.8 | 6.5 | 6.6 | 6.6 | 6.6 |
| 0 | 0 | 0.0 | 6.3 | 6.6 | 6.6 | 6.7 | 6.6 |
| AVERAGE | | | 6.6 | 6.6 | 6.5 | 6.6 | 6.6 |

TABLE 2

The Parts Per Million (ppm) Carry-Over of Sodium from the Sodium Hydroxide Solution.

| Concentration of organic acid (%) | Concentration of sodium hydroxide (%) | Time in sodium hydroxide solution (min) | ppm sodium Replication 1 | 2 | 3 | 4 | average |
|---|---|---|---|---|---|---|---|
| 0 | 0 | 0 | 36 | 38 | 36 | 38 | 37 |
| 2 | 5 | 1.5 | 34 | 38 | 38 | 38 | 37 |
| 2 | 5 | 2.0 | 36 | 42 | 36 | 38 | 38 |

| 2 | 5 | 2.5 | 38 | 38 | 38 | 38 | 38 |
| 2 | 8 | 1.5 | 40 | 40 | 36 | 36 | 38 |
| 2 | 8 | 2.0 | 38 | 38 | 38 | 38 | 38 |
| 2 | 8 | 2.5 | 38 | 38 | 38 | 38 | 38 |
| 2 | 11 | 1.5 | 44 | 38 | 40 | 40 | 41 |
| 2 | 11 | 2.0 | 38 | 38 | 34 | 38 | 37 |
| 2 | 11 | 2.5 | 36 | 40 | 38 | 38 | 38 |
| AVERAGE | | | 38 | 39 | 37 | 38 | 38 |

What is claimed is:

1. A process for deskinning catfish and like skin-bearing fish which comprises the successive steps of
   a. contacting the skin of the fish with hot aqueous caustic for from about 0.5-5 minutes until the skin is solubilized;
   b. immediately thereafter rinsing the fish until a substantial portion of the caustic and the skin is removed therefrom;
   c. contacting the exposed surfaces of the fish with an aqueous solution of a non-toxic acid until all residual caustic is neutralized; and
   d. rinsing the acid-washed fish with water to about neutrality.

2. A process according to claim 1 wherein the acid is an edible acid.

3. A process according to claim 2 wherein the edible acid is citric acid or acetic acid.

4. A process according to claim 1 wherein the starting fish is frozen.

5. A process according to claim 1 wherein the starting fish is eviscerated.

6. A process according to claim 1 wherein the concentration of the caustic is about 5-15 percent.

7. A process according to claim 1 wherein the fish is maintained in contact with the caustic for about 0.5-3 minutes.

8. A process according to claim 1 wherein the temperature of the caustic is at least 150° F.

9. A process according to claim 1 wherein the starting fish is eviscerated; the fish is immersed in a bath of caustic of a concentration of about 5-11 percent and a temperature of about 170°-212° F. and maintained therein for about one-half to 3 minutes; and the fish is immersed in a bath of citric or acetic acid.

10. A process according to claim 9 wherein the fish is frozen and the fish is immersed in a bath of aqueous acid of a concentration of about 1-5 percent for about one-half to 3 minutes.

* * * * *